United States Patent
Valantin

[15] 3,638,424
[45] Feb. 1, 1972

[54] DEVICE FOR DRIVING A HUB IN CONTINUOUS UNIDIRECTIONAL ROTATION BY MEANS OF RECTILINEAR TOOTHED RACKS

[72] Inventor: Alfred Valantin, Oise, France
[73] Assignee: Charbonnages De France, Paris, France
[22] Filed: Dec. 1, 1970
[21] Appl. No.: 94,083

[52] U.S. Cl. ................................................60/51, 92/136
[51] Int. Cl. ...........................................................F03c 1/06
[58] Field of Search ..................91/411, 412; 60/51; 92/136, 92/138

[56] References Cited

UNITED STATES PATENTS

| 3,104,589 | 9/1963 | Rudd | 91/412 X |
| 3,142,962 | 8/1964 | Lohbauer | 60/51 |
| 3,246,581 | 4/1966 | Carr | 92/138 X |
| 3,436,913 | 4/1969 | Müller et al. | 60/51 |
| 3,530,668 | 9/1970 | Siebers et al. | 60/51 |
| 3,537,358 | 11/1970 | Bunyard | 92/136 |

Primary Examiner—Edgar W. Geoghegan
Assistant Examiner—Leslie J. Payne
Attorney—Karl W. Flocks

[57] ABSTRACT

A device for driving a hub in continuous rotation in one single direction by means of two rectilinear actuating racks which have alternating rectilinear movements simultaneously in opposite directions and of two alternately rotating driving members coupled to the hub when they rotate in a given direction.

Each driving member is provided with a curved tooth rack continuously engaging with one of the rectilinear actuating racks s while two rectilinear synchronizing racks are each rigidly fixed for translation to one of the actuating racks and are simultaneously and continuously engaged with a toothed synchronizing pinion having an axis of rotation fixed with respect to the said rectilinear racks.

7 Claims, 7 Drawing Figures

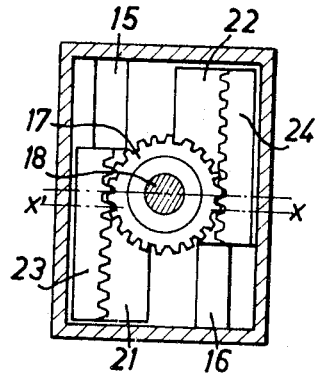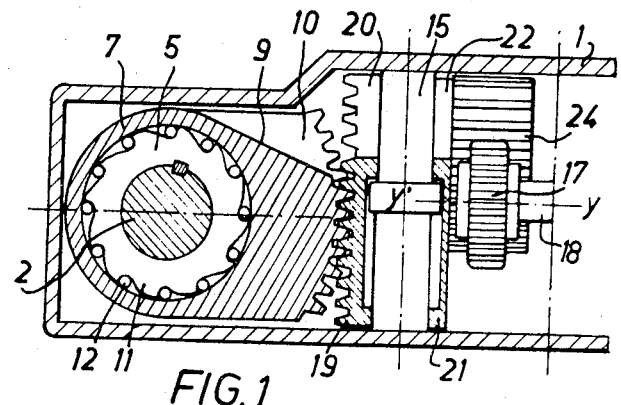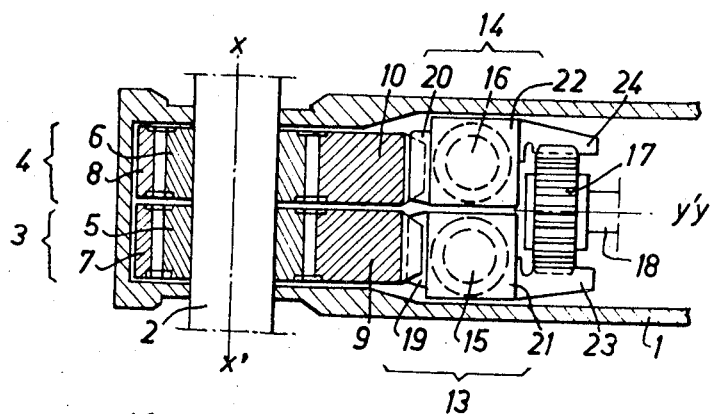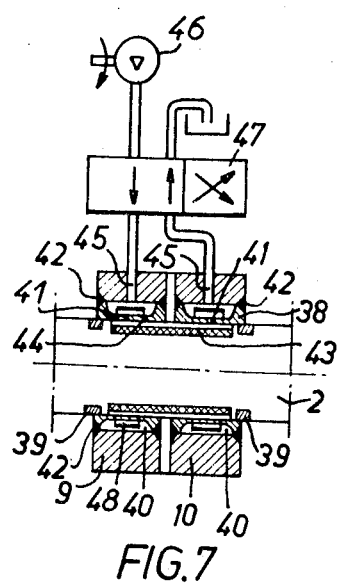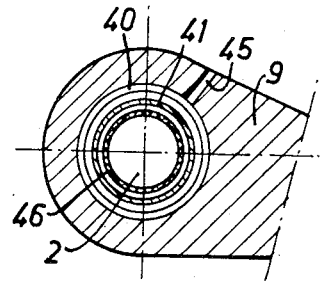

DEVICE FOR DRIVING A HUB IN CONTINUOUS UNIDIRECTIONAL ROTATION BY MEANS OF RECTILINEAR TOOTHED RACKS

The present invention relates to an improved device for driving a hub in continuous rotation in one single direction by means of elements to which are imparted alternating rectilinear movements, such as rectilinear toothed racks having alternating rectilinear movements of translation.

Devices of this kind are already known in which two independent racks having simultaneously opposite alternating rectilinear movements are successively and alternately engaged with a pinion fast for rotation with the hub to to be driven. In order to ensure continuous rotation of the hub in one single direction and to prevent the movement of translation of one of the racks interfering with the action of the other rack on the pinion, it is necessary to provide a mechanism which ensures at the same time the simultaneous reversals of the movements of translation of the racks, the engagement of one of the toothed racks with the pinion and the decoupling of the other rack from the pinion.

The mechanism is generally complicated and relatively fragile. Furthermore, since at a given moment one rack only engages with the pinion, the power available on the other rack is not utilized.

Devices are also known in which two irreversible couplings (freewheels, for example) acting in the same direction are arranged side by side on the same hub, and in which two rectilinear parallel racks rigidly fixed together are given an alternating rectilinear movement and each engages continuously with the driving portion of one of the irreversible couplings. In these devices, the simultaneous action of the reversals of the direction of translation of the racks is obtained naturally by the sole face that they are fixed together. But in this case also, at a given moment, only the power available on one rack is transmitted to the hub to be driven.

Furthermore, devices are known for coupling in rotation by friction with each other between two internal coaxial members, in which the bringing into contact of the friction surfaces associated with the two members is effected by means of the expansion, under the action of a fluid under pressure, of an expansible annular chamber. By the introduction and evacuation of the fluid at judiciously chosen moments, these devices, like the free wheels, make it possible to drive the receiving member for the period of time during which the driving member is rotating in a certain direction.

The present invention proposes to supply a device of the type referred to in the preceding description, permitting the power available on the two racks to be utilized to the maximum extent, the said device being robust, of small overall size and simple construction, and which is more particularly utilizable for driving in rotation the hub which in turn provides the rotary drive of the tools of an ore or rock-cutting machine, arranged on the periphery of discs rigidly fixed for rotation on the said hub, this latter being arranged at the extremity of an arm articulated on the frame of the machine.

The device according to the invention permits the drive of a hub by means of two rectilinear actuating racks which have alternating rectilinear movements simultaneously in opposite directions, and of two alternately rotating driving members coupled to the hub when they rotate in a given direction, and is characterized in that each driving member is provided with a curved toothed rack continuously engaging with one of the rectilinear actuating racks, in that two rectilinear synchronizing racks are each rigidly fixed for translation to one of the actuating racks and are simultaneously and continuously engaged with a toothed synchronizing pinion having an axis of rotation fixed with respect to the said rectilinear racks, and in that driving means are provided for giving the two sets of racks simultaneously opposite alternating rectilinear movements.

The invention will be more clearly understood by referring to the description which follows below, given by way of example with respect to the accompanying drawings, in which:

FIG. 1 is a cross section in elevation, made along a plane at right angles to the axis of the hub to be driven, of one form of construction of the device according to the invention, comprising two freewheels;

FIG. 2 is a view in longitudinal section made following a plane which passes through the axis of the hub to be driven;

FIG. 3 is an end view of the device;

FIG. 6 is a view in longitudinal elevation cross section of a form of embodiment which employs two friction couplings by means of an expansible annular chamber;

FIG. 7 is a view of the device of FIG. 6 in transverse section.

Figure 4:
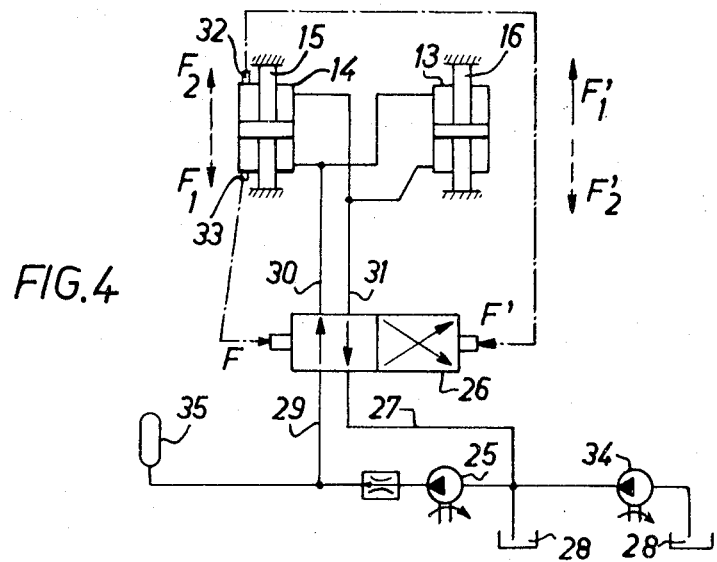
FIG. 4 shows the basic diagram of one form of construction of the hydraulic circuit associated with the device shown in FIGS. 1 to 3.

In FIGS. 1 to 3, the reference 1 indicates the casing which forms the supporting frame of the apparatus according to the invention, and the reference 2 indicates the hub to be driven in rotation about its axis $x'x$.

Two identical irreversible couplings indicated by the general references 3, 4 or freewheel couplings, are arranged side by side on the hub 2 and are each composed as shown by way of example, of an internal cylindrical ring 5, 6 keyed on the shaft, and of an external coaxial ring 7, 8 extended by a segment 9, 10 toothed on its curved edge and constituting what has been termed above a "driving member"; each of the rings 5, 6 is hollowed out with sloping faces 11, and rollers 12 are arranged between the internal cylindrical surface of each ring 7, 8 and the sloping faces formed in the corresponding ring 5, 6.

Two double acting hydraulic jacks with double piston rods 13, 14 mounted mechanically and hydraulically in opposition, having their axes included in a plane parallel to the axis $y'y$ and at right angles to the axis $x'x$ are each arranged close to the toothed edge of the segments 9, 10 the piston 15, 16 of each jack being rigidly fixed to the casing 1.

A pinion 17, known in the text which follows as the "synchronizing pinion" is freely mounted on a shaft 18 fixed to the casing and having its axis $y'y$ included in the central plane of the two toothed segments 9, 10 and at right angles to the axis $x'x$.

Each of the toothed segments 9, 10 engages continuously with a rectilinear during rack 19, 20, rigidly fixed to the body 21, 22 of one of the jacks, while the synchronizing pinion 17 is continuously and simultaneously engaged with two rectilinear sychronization racks 23, 24 each fixed to the body 21, 22 of one of the jacks, the latter being advantageously of the double acting type.

There has been shown in FIG. 4 the basic diagram of a possible form of embodiment of the hydraulic circuit supplying the two jacks 13, 14. This circuit comprises essentially:

A main pump 25;

A distributor 26 of the four-way type with two positions;

A conduit system 27 connecting the distributor to the tank 28;

A high-pressure conduit system 29 connecting the distributor 26 to the pump 25;

Two utilization conduits 30 and 31 each connecting continuously and simultaneously one of thee"utilization" outlets of the distributor and the two jacks in such manner that the bodies are moved simultaneously in opposite directions (arrows $F_1$, $F'_1$, on the one hand; arrows $F_2$, $F'_2$ on the other).

Two "end-of-travel" devices 32 and 33, not shown in detail, detect the arrival at its extreme positions of the body of one of the jacks and control in a manner known per se, the changeover of the distributor 26 (arrows F and F').

The circuit is advantageously completed by a topping-up pump 34 and a hydraulic accumulator 35 coupled directly to the high-pressure conduit 29, the function of this accumulator being explained later.

The operation, of the apparatus according to the invention is as follows:

In the position of the distributor 26 shown in FIG. 4, the utilization conduit put under pressure is the conduit 30. It follows that the body of the jack 13 moves in the direction $F_2$, and that simultaneously the body of the jack 14 moves in the opposite direction $F'_2$.

The body of the jack 13 drives the toothed segment 9 and the external ring of the freewheel 3 in the driving direction, while the body of the jack 14 drives the toothed segment 10 and the outer ring of the freewheel 4 in the nondriving direction (see FIG. 1). However, the synchronizing pinion 17 transmits the power developed by the jack 14 to the rack 23 and to the body of the jack 13. In actual fact, the power transmitted to the hub 2 is the sum of the powers developed by the jacks 13 and 14.

When the body of the jack 13 has reached its extreme top position, the end-of-travel device 32 causes the changeover of the distributor 26, which results in the application of pressure to the conduit 31 and the simultaneous reversals of the directions of application of the hydraulic pressure in the two jacks 13 and 14. The body of the jack 13 then moves in the direction $F_1$, while the body of the jack 14 moves in the direction $F'_1$.

The body of the jack 13 drives the toothed segment 9 and the internal ring of the free wheel 4 in the driving direction, the synchronization pinion 17 transmitting the power developed by the jack 13 to the rack 24 and to the body of the jack 14. In this case also, the power transmitted to the hub 2 is the sum of the powers developed by the jacks 13 and 14. When the jack 13 has reached its extreme bottom position, it is the end-of-travel device 33 which effects the change over of the distributor 26, and a fresh operating cycle is produced, during which the sum of the powers developed by the two jacks is applied to the hub 2 through the intermediary of the jack 13 and the driving member 3.

At the moment of changeover of the distributor 26, a dead time appears during which the freewheel which was driving no longer drives and the freewheel which is about to drive has not yet begun to do so due to the fact that its external ring has not yet turned through a sufficient angle to effect the jamming of the rollers between the internal surface of the external ring and the sloping faces formed in the internal ring.

It follows that the pressure in the high-pressure portion of the hydraulic circuit has a tendency to fall considerably and abruptly returns to its normal value at the moment when the freewheel starts to drive, which may result in jerks in the operation of the device, detrimental to the mechanical strength of all the parts of the device.

The hydraulic accumulator 33 compensates for these variations of pressure by maintaining this pressure during the dead times at the value for which it is calibrated, and thus accelerates the takeup action of the freewheel which is to begin to drive.

Figure 5:
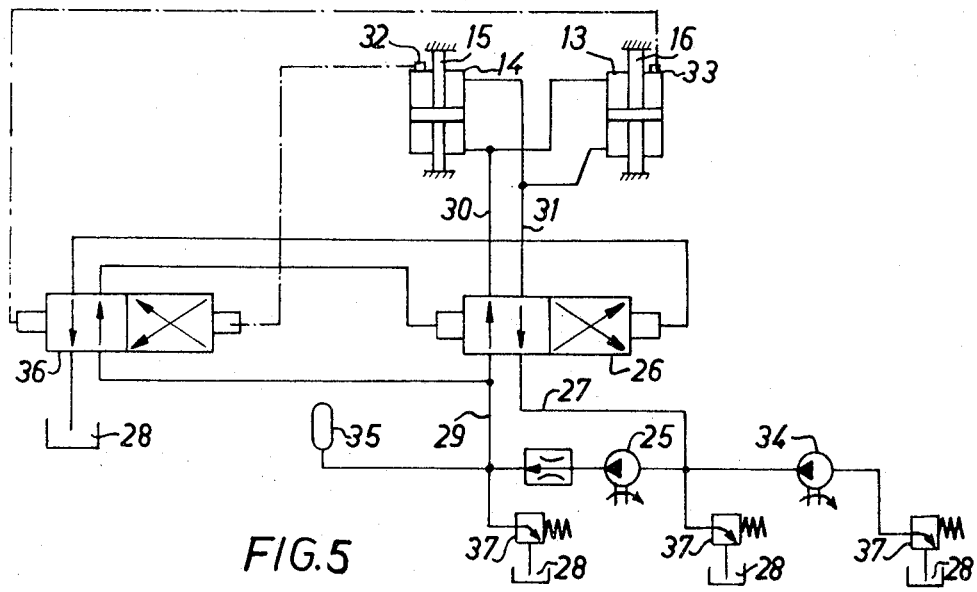
FIG. 5 shows the basic diagram of a further form of construction of the said hydraulic circuit.

There has been shown in FIG. 5 an alternative form of the hydraulic circuit which is distinguished from that above by:

The interposition of a four-way distributor 36 with two positions with hydraulic amplification, piloted by the end-of-travel devices 32 and 33 of the jacks and serving to accelerate the changeover of the distributor 26;

The addition of discharge valves 37 having the function of limiting the hydraulic pressure in the case where the resistive torque presented by the hub 2 is too great (locking, braking, etc.).

In addition, it may be advantageous for reasons of convenience of assembly and construction to arrange the end-of-travel devices, not on the same jack but one on one jack and the other on the other jack. In that case, they must be arranged, at the same geographic extremity of the two jacks, as shown in FIG. 5.

In the unit shown in FIGS. 6 and 7, the coupling device between the hub 2 and the toothed segments 9 and 10 is of the constriction type with an expansible annular chamber.

In this form of embodiment, each ratchet wheel is replaced by an intermediate socket 38 which is carried by self-lubricating bushes 39 arranged on the hub 2 and is provided on its periphery with a groove 40, the section of which has the shape of a U open towards the internal wall of the toothed segment 9, while its depth is such that the wall 41 existing between the groove 40 and the hub 2 is very thin.

The intermediate socket 38 is fixed in a fluid tight manner on the segment 9 by means of two circular welding end-beads 42 located on each side of the opening of the groove 40.

The hub 2 is advantageously provided with a friction lining 43 constituted by two semicylindrical shells inserted in a cylindrical groove 44 formed in the hub, and the external surface of which is located slightly recessed with respect to the surface of the hub.

A conduit system 45 is formed in each toothed segment 9 in order to be able to couple the corresponding fluidtight annular chamber 40 to a source 46 of fluid under pressure, a hydraulic circuit symbolically represented by the four-way two-position distributor 47 permitting the coupling between the chamber 40 and the source 46 to be established or interrupted at will.

It can immediately be seen that the hydraulic system must be piloted in such manner that it applies a hydraulic pressure to the interior of the chamber 40 when the driving member rotates in a given sense which is identically the same for the two driving members, and on the contrary it does not apply any pressure when the driving member rotates in the reverse direction.

If the volume of the chamber 40 is too large, which is liable to cause a filling time of the chamber and a response time which are too long, it is advantageous to arrange in the recess, before welding the socket 38 on the segment 9, a floating filling ring 48, the volume of which is slightly less than the volume of the recess.

I claim:

1. A device for driving a hub in rotation, comprising:
   two rotating driving members mounted freely rotatable on said hub and each comprising a toothed circular segment, of which the generator line of the teeth is parallel to the axis of the hub;
   means for selectively coupling said driving members to said hub for a given direction of rotation;
   two driving assemblies each consisting of a hydraulic double acting jack with a double piston rod arranged at right angles to said hub and fixed with respect to this latter and with a body movable along said rod; a rectilinear toothed actuating rack rigidly fixed for translation with said jack body and continuously engaged with the circular toothed segment of one of said driving members; a rectilinear synchronization rack rigidly fixed for translation to said jack body and in which the generator line of the teeth is at right angles to the axis of said hub; and a synchronizing pinion continuously engaged with both the two synchronizing racks, the axis of said pinion being at right angles to the axis of the hub and fixed with respect to said hub; and a hydraulic supply circuit for the two jacks, applying alternating rectilinear movements of simultaneously opposite directions to the bodies of said jacks.

2. A device for driving a hub in rotation as claimed in claim 1, in which the hydraulic circuit of said hydraulic jacks comprises a high-pressure pump, a hydraulic accumulator coupled to the outlet of said pump, a four two-position valve of which each utilization channel is continuously connected to one of the extremities of a jack and simultaneously to the geographically opposite extremity of the other jack, said valve being piloted by end-of-travel devices each arranged at one of the extremities of the body of one of said jacks.

3. A device for driving a hub in rotation as claimed in claim 1, in which the hydraulic circuit of said hydraulic jacks comprises a high-pressure pump, a hydraulic accumulator coupled to the outlet of said pump, a first valve with four ways and two positions, in which each utilization channel is continuously connected to one of the extremities of one of said jacks and simultaneously to the geographically opposite extremity of the other jack, a second accelerator valve with four ways and two positions with hydraulic amplification adapted to pilot said first valve, said second valve being piloted by end-of-travel devices arranged at the geographically identical extremities of each said jack.

4. A device for driving a hub in rotation as claimed in claim 2, in which the means for selectively coupling said driving members to the hub in one given direction of rotation are constituted, for each driving member, by a free wheel of which the external cage is rigidly fixed for rotation with the corresponding driving member, and in which the normal cage is rigidly fixed for rotation with said hub.

5. A device for driving a hub in rotation as claimed in claim 3, in which said means for selectively coupling the driving members to the hub in one given direction of rotation are constituted, for each driving member, by a freewheel, the external cage of which is fast for rotation with the corresponding driving member, and in which the internal cage is fast for rotation with said hub.

6. A device for driving a hub in rotation as claimed in claim 2, in which the means for selectively coupling the driving members with the hub in one direction of rotation are constituted, for each driving member, by two cylindrical coaxial sleeves one inside the other surrounding the hub, welded to each other by two welding beads, each coupling the two extreme edges of the two sleeves located facing each other, a cylindrical groove being formed in the internal sleeve and having a depth such that the wall left on the hub side is thin, the outer sleeve being traversed by a conduit putting the interior of the groove into communication with a hydraulic circuit applying a hydraulic pressure when the driving member is rotating in a given direction identical for the two driving members.

7. A device for driving a hub in rotation as claimed in claim 3, in which the means for selectively coupling the driving members to the hub in one given direction of rotation are constituted, for each driving member, by two coaxial cylindrical sleeves, one inside the other and surrounding the hub, welded to each other by two welding beads each coupling together the two extreme edges of the two sleeves located facing each other, a cylindrical groove being formed in the inner sleeve and having a depth such that the wall let on the hub side is thin, the outer sleeve being traversed by a conduit putting the interior of the groove into communication with a hydraulic circuit applying a hydraulic pressure when the driving member is rotating in a given direction which is identical for the two driving members.

* * * * *

UNITED STATES PATENT OFFICE
CERTIFICATE OF CORRECTION

Patent No. 3,638,424          Dated February 1, 1972

Inventor(s) Alfred Valantin

It is certified that error appears in the above-identified patent and that said Letters Patent are hereby corrected as shown below:

After line 8, the following should be inserted:

[30]          Foreign Application Priority Data

December 8, 1969   France...............69/42,406

Signed and sealed this 20th day of June 1972.

(SEAL)
Attest:

EDWARD M. FLETCHER, JR.          ROBERT GOTTSCHALK
Attesting Officer                Commissioner of Patents